United States Patent [19]

Beckerman

[11] 4,068,540
[45] Jan. 17, 1978

[54] TRANSMISSION CONTROL

[75] Inventor: Joseph W. Beckerman, Livonia, Mich.

[73] Assignee: Massey-Ferguson Inc., Detroit, Mich.

[21] Appl. No.: 711,344

[22] Filed: Aug. 4, 1976

[51] Int. Cl.² ............................................. G05G 5/10
[52] U.S. Cl. ................................... 74/476; 74/473 R
[58] Field of Search ...................... 74/473 R, 476, 477

[56] References Cited

U.S. PATENT DOCUMENTS

| 3,242,758 | 3/1966 | Harris et al. | 74/476 |
| 3,636,793 | 1/1972 | Bieber | 74/476 |
| 3,757,598 | 9/1973 | Van Dest | 74/473 R |
| 3,975,970 | 8/1976 | Elfes et al. | 74/473 R |
| 3,987,686 | 10/1976 | Paplaski | 74/476 |

Primary Examiner—Allan D. Herrmann
Attorney, Agent, or Firm—John C. Thompson

[57] ABSTRACT

A transmission control useable with a transmission of the type having a first change gear mechanism for establishing a plurality of drive speeds and a second change gear mechanism for establishing either a forward or reverse drive for each of said plurality of drive gears, the transmission control including stop means capable of preventing the transmission from operating in one or more selected reverse speeds to prevent high speed reverse operation of a vehicle employing the transmission.

3 Claims, 4 Drawing Figures

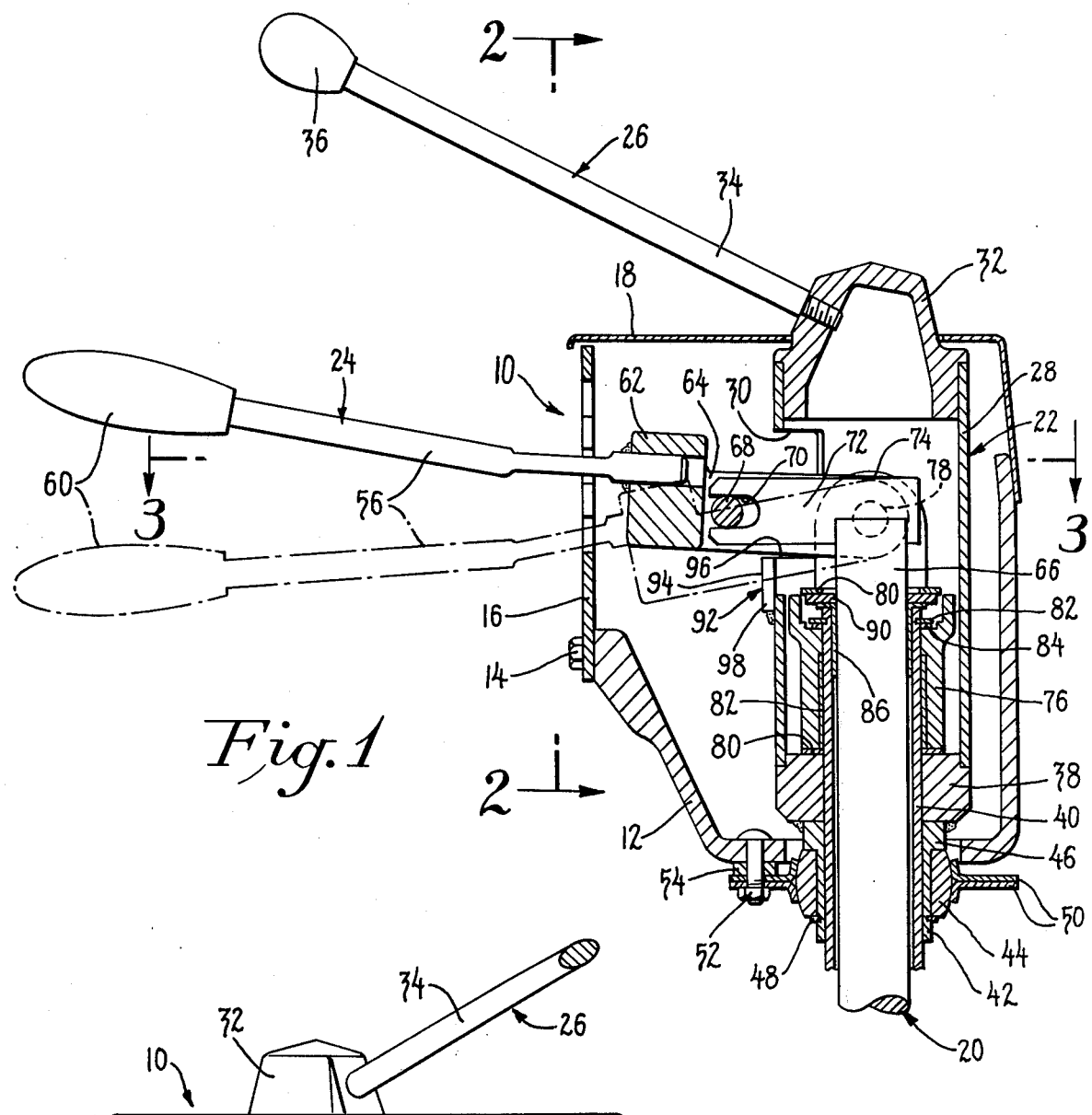
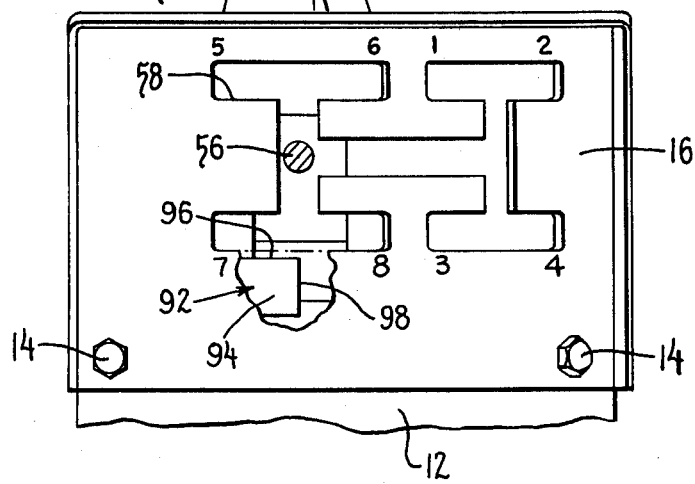

TRANSMISSION CONTROL

The present transmission control is an improvement over the design shown in U.S. Pat. No. 3,975,970, which mechanism is useable with a transmission of the type disclosed in U.S. Pat. No. 3,757,598.

The present invention relates generally to a transmission control for a vehicle transmission of the type having a first change gear mechanism for establishing a plurality of speeds and a second change gear mechanism for driving the vehicle in either a forward or reverse direction in any of the various speeds. More particularly, this invention relates to a transmission control of the type which prevents high speed reverse gear operation of a vehicle.

In agricultural and industrial practice it is common to operate the power plant or engine at a generally constant speed and to vary the speed of the tractor by means of a transmission having a large number of output speeds. In one such transmission the transmission has eight differing speed ranges the lower and intermediate speed ranges being the usual working speeds. Frequently it is desireable to shuttle shift the transmission between forward and reverse gears without changing the output speed of the transmission gearing, as for example when working in a barn yard loading manure. Therefore, it is common in transmissions of this type to provide a change gear mechanism which operates independently of the forward speed settings so that the tractor can be placed in a reverse gear setting corresponding to any of the forward gear settings. One such transmission is shown in U.S. Pat. No. 3,757,598 issued Sept. 11, 1973.

A transmission control for the type of transmission referred to above customarily will include shift lever means for selecting the desired output speed of the transmission, and a further shift lever for disposing the transmission output in either a forward or reverse mode. Thus, one form of prior art mechanism consists of a first tube assembly which is rotatable about its axis and is also shiftable along its axis, the first tube assembly being controlled by a shift lever mechanism to dispose the transmission in any of its forward speeds, and also a second tube assembly concentric about the first tube assembly, which tube assembly is rotatable about its axis by a forward - reverse control lever mechanism to dispose the output of the transmission in either a forward or reverse mode in any of the various gears selected by the shift lever mechanism. In this particular design, which is disclosed in the aforementioned U.S. Pat. No. 3,975,970, the operator can shuttle shift between forward and reverse in any of the various gear settings.

As high speed reverse operation of an agricultural or industrial tractor is seldom desireable it is an object of the present invention to provide means which will prevent high speed reverse operation of an agricultural or industrial tractor employing a transmission of the type referred to above.

More particularly, it is an object of the present invention to provide stop means which will prevent the forward - reverse change gear mechanism of a transmission from being shifted into its reverse mode when the variable speed change gear mechanism of a transmission is disposed in a high gear setting, or alternatively to prevent the change gear mechanism from being disposed in a high speed gear setting when the forward - reverse gear setting is disposed in its reverse position.

These and other objects and advantages of the present invention will be apparent to those skilled in the art after a consideration of the following detailed description taken in conjunction with the accompanying drawings in which a preferred form of the present invention is illustrated.

FIG. 1 is a section taken through a portion of a transmission control in which the principles of the present invention are incorporated.

FIG. 2 is a view taken generally along the line 2—2 in FIG. 1.

Figure 3:
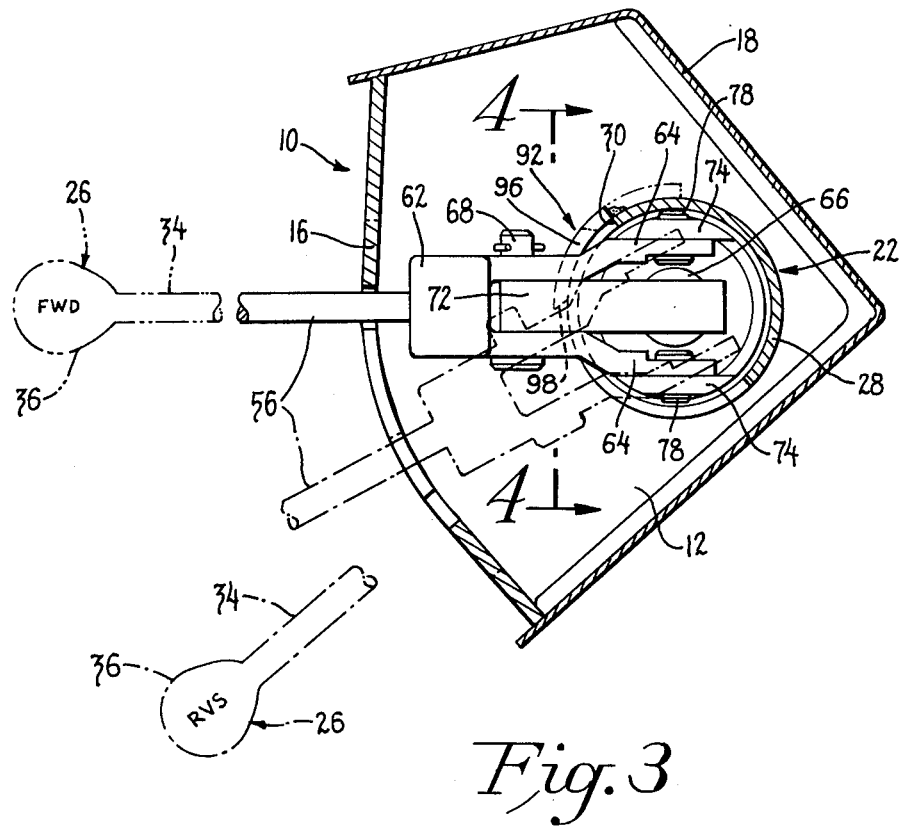
FIG. 3 is a view taken generally along the line 3—3 in FIG. 1.

Referring first to FIG. 1, the transmission control is indicated generally at 10. The transmission control is mounted in part within a frame 12, the frame having secured thereto by bolts or the like 14 a gear shift pattern plate 16. A cover 18 is disposed above the gear shift pattern plate and serves to enclose the upper portion of the transmission control along with the gear shift pattern plate in the frame. The cover may be secured to the frame in any conventional manner, as for example by screws. The upper ends of first and second tube assemblies indicated generally at 20, 22, respectively, are disposed within the frame. It should be noted at this point that the lower ends of the tube assemblies 20, 22 are interconnected with various fork elements by shift rails in a manner not material to an understanding of the present invention. Some of the various forks are utilized to select the output feed of a first change gear mechanism of a transmission, and one of the shift forks is utilized to dispose a second change gear mechanism of the transmission in either a forward or reverse drive. Thus, the first tube assembly may be interconnectable with a plurality of shift rails and forks for establishing a drive speed of the transmission, the second tube assembly operating through an additional fork and shift rail for disposing a second change gear mechanism in either a forward or reverse drive.

As can be seen from FIG. 1 the first and second tube assemblies 20, 22 are mounted coaxially with respect to each other with the second tube assembly 22 being disposed about the first tube assembly 20. First shift lever means, indicated generally at 24, is interconnected with one end of the first tube assembly, the first shift lever means being shiftable between a plurality of positions corresponding to the plurality of drive speeds of the transmission. During shifting of the first shift lever means the first tube assembly will be either rotated about its axis or moved in a direction along its axis. In the embodiment shown in FIG. 1 a second shift lever means 26 is interconnected with the second tube assembly 22, the second shift lever means being moveable between forward and reverse positions. As it is moved between forward and reverse positions the second tube assembly will be caused to be rotated about its axis.

The second tube assembly 22 includes a slotted tube 28 which is provided with a slot or window 30 through which the first shift lever means 24 projects. A handle support 32 is secured to the upper end of the slotted tube 28, the handle support being provided with a threaded aperture which receives the threaded end of the shift handle 34. The other end of the shift handle 34 receives a knob 36. The handle support 32, the shift handle 34, and the knob 36 form the second shift lever means.

The lower end of the slotted tube 28 is rigidly secured as by welding to a spacer 38, the spacer being in turn rigidly secured to a tube 40 and bushing 42. A bearing 44 is disposed about the bushing 42, the bushing being held from axial movement with respect to the bearing 44 by an enlarged boss portion 46 at one end and a snap ring 48 which is received within a suitable groove on the bushing 42. The bearing 44 is in turn carried by a suitable bearing support 50 which is secured to the frame 12 by nuts and bolts 52 and spacers 54, only one of each being shown in FIG. 1. The lower end of the tube 40 in interconnected with a shift rail and fork in a manner not material to the present invention, the fork in turn disposing a second change gear mechanism of a transmission in either a forward or reverse position.

The first shift lever means includes a shift lever 56 which passes through a shift pattern aperture 58 formed in the gear shift pattern plate 16. One end of the shift lever is provided with a knob 60 and the other end is secured to one end of a clevis 62 by welding or the like. The clevis 62 includes two spaced apart arms 64 (FIG. 3) one end of which are disposed to either side of the upper end of the shift rod or tube 66 of the first tube assembly 20. Extending between the other end of the arms 64 of the clevis 62 is a clevis pin 68. The clevis pin passes through a slot 70 formed in one end of a slotted member 72, the other end of the slotted member being rigidly secured to the upper end of the shift rod or tube 66. The end of the slotted member 72 in which the slot 70 is formed is closely confined between the inner surfaces of the other end of the arms 64 as can best be seen in FIGS. 3 and 4.

The end of the clevis 62 remote from the shift lever 56 is secured to spaced apart upwardly extending ears 74 of a tubular support 76 by pivot pins 78. The lower end of the tubular support is journaled for rotational movement about the tube 40 by bearings 80, 82. The tubular support 76 is held from axial shifting movement with respect to the tube 40 by a snap ring 82 and washer 84. The upper end of the shift rod or tube 66 is journaled for rotational movement within the upper end of the tube 40 by a bearing 86, which bearing is maintained in its desired location by means of a snap ring 88 and washer 90. As the second shift lever means is moved to the various gear positions in the shift pattern aperture, which gear positions are represented by the numerals 1 through 8, 1 being the lowest gear, and 8 being the highest gear, the shift rod or tube 66 will be rotated about its axis and will also be moved along its axis. Thus, for example, when the shift lever is moved from gear position 1 to gear position 2 the tube 66 will only be rotated. However, when the shift lever 56 is moved from gear position 2 to gear position 3 the tube 66 will be rotated, then shifted vertically, and then rotated again. The vertical shifting of the tube is accomplished by moving the clevis pin 68 downwardly from the full line position shown in FIG. 1 to that position which it would occupy when the handle 56 is the broken line position, this movement in turn forcing the slotted member 72 downwardly which will in turn shift the tube 66 downwardly.

In accordance with the principles of the present invention the structure, which has been described in detail above, is provided with stop means which will prevent the reverse operation of a tractor in either seventh or eighth gear. Thus, the stop means, which is indicated generally at 92, is rigidly secured to the slotted tube 28 of the second tube assembly 22, the stop means being an arcuate plate 94. The arcuate plate 94 is provided with a generally horizontally extending stop surface 96 and a generally vertically extending stop surface 98.

The arcuate plate serves to block movement of the shift lever 56 into seventh or eighth gear when the shift lever 34 is in its reverse gear position. Alternatively, the blocking plate also serves to block shifting movement of the shift lever 34 into its reverse gear position when the lever 56 is already disposed in its seventh or eighth gear position. However, the blocking plate will not interfere with other movements of the shift lever means. Thus, the upper stop surface of the arcuate plate is so positioned with respect to the first shift lever means 24 that when the first shift lever means is disposed in the intermediate position shown in FIGS. 1 and 2, the upper stop surface 96 will be disposed below the lower surface of the clevis 62. Thus, it can be appreciated that a shift can be made to or from any of the gears 1, 2, 5 or 6 without contacting the horizontal stop surface 96. In addition, the arcuate plate 94 is so mounted on the slotted tube 28 that it will not interfere with shifting to or from any of the gears 1, 2, 3, or 4, even though the plate 94 may be disposed in either its forward position, shown in broken lines in FIG. 3, or in its reverse position shown in full lines in FIG. 3. Thus, when the yoke is disposed for example in either first or third gear, (shown in broken lines in FIG. 3) the side of the yoke which is most closely adjacent to the arcuate plate 94 will in fact be disposed to one side of the plate 94 to permit shifting movement of the yoke into gears 3 and 4.

Figure 4:
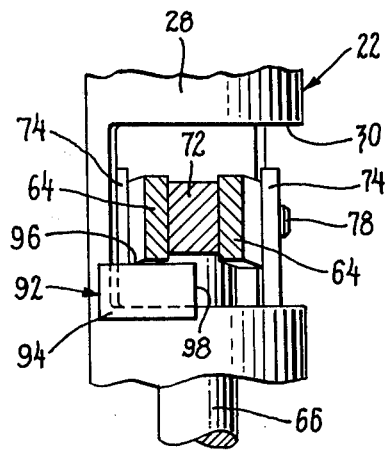
FIG. 4 is a view taken generally along the line 4—4 in FIG. 3.

In operation, if the second shift lever means 26 is disposed in its reverse position, shown in phantom in FIG. 3, the stop will be disposed in its full line position. It will then be possible to move the first shift lever mechanism 24 through any of the gear positions 1, 2, 3, 4, 5, and 6. However, when the yoke is in the high range position, indicated in full line in FIG. 3, downward movement of the yoke into the seventh or eighth gear positions will be blocked by the horizontal stop surface 96 thereby preventing the operator from placing the transmission in high speed seventh or eighth gears when the transmission has already disposed in a reverse gear. Alternatively, if the first shift lever means is already disposed in either seventh or eighth gear it will not be possible to shift from a forward position to a reverse position. Thus, it is only possible to dispose the first shift lever mechanism 24 in seventh of eighth gears when the stop means 92 is in the position shown in broken lines in FIG. 3. Movement of the shift handle 34 from a forward position to a reverse position will not be possible when the first shift lever means is in the high speed seventh or eighth gears as the stop will not permit full counter clockwise rotation of the shift handle as the generally vertically extending surface 98 will then contact one edge of the clevis 62.

While a preferred structure in which the principles of the present invention have been incorporated are shown and described above, it should be appreciated that other variations would be obvious to those skilled in the art. For example, the second tube assembly could have vertical movement in addition to rotational movement. Such a design would be desireable when the second shift lever means is utilized to shift an auxiliary transmission between low, intermediate, and high speed positions in one position of rotation of the tube, and to shuttle shift between forward, neutral, and reverse positions in another rotational position of the tube. When shuttle shifting the second shift lever means would be disposed in the reverse position shown in phantom lines in FIG. 3 and shuttle shifting would be permissable for any of gears one through six, however, vertical shifting movement would be blocked into reverse gear when the first shift lever means is disposed in gears seven or eight. In addition to the variation described above it is apparent that other modifications of this invention will be apparent to those skilled in the art. Therefore, it is to be understood that the invention is not to be limited to the particular details, shown and described above, but that, in fact, widely differing means may be employed in the practice of the broader aspects of this invention.

What is claimed is:

1. A transmission control for use with a transmission of the type having a first change gear mechanism for establishing a plurality of drive speeds and a second change gear mechanism for establishing either a forward or reverse drive for each of said plurality of drive speeds, said transmission control including:
    first shift lever means shiftable between a plurality of positions corresponding to each of said plurality of drive speeds;
    a first tube assembly interconnecting the first shift lever means with the first change gear mechanism;
    second shift lever means shiftable between forward and reverse positions; and
    a second tube assembly interconnecting the second shift lever means with the second change gear mechanism, the second tube assembly being coaxially disposed about the first tube assembly;
    said transmission control means being further characterized by the combination therewith of
    stop means mounted on the second tube assembly and contactable by the first shift lever means to prevent the transmission from operating in one or more selected reverse speeds.

2. The transmission control set forth in claim 1 wherein each of said first and second tube assemblies is rotatable about its axis, and wherein the stop means is provided with a generally vertically extending stop surface contactable with the first shift lever means and operable to prevent the second shift lever means from being shifted into a reverse position when the first shift lever means is disposed in a high speed position.

3. The transmission control set forth in claim 1 wherein the first tube assembly is mounted for axial shifting movement and the second tube assembly is mounted for rotation movement about the axis of the first tube assembly, and wherein the stop means is provided with a generally horizontally extending stop surface contactable with the first shift lever means and operable to prevent the first shift lever means from being moved downwardly into a high speed range position when the second shift lever means is disposed in a reverse position.

* * * * *